(12) United States Patent
Byun et al.

(10) Patent No.: US 9,118,050 B2
(45) Date of Patent: Aug. 25, 2015

(54) SECONDARY BATTERY HAVING ELECTRODE TERMINAL FASTENED WITH NUT

(75) Inventors: Sangwon Byun, Yongin-si (KR); Sangeun Cheon, Yongin-si (KR); Sungbae Kim, Yongin-si (KR); Jongseok Moon, Yongin-si (KR); Zin Park, Yongin-si (KR)

(73) Assignees: SAMSUNG SDI CO., LTD., Yongin-si, Gyeonggi-do (KR); ROBERT BOSCH GmbH, Stuttgart (DE)

( * ) Notice: Subject to any disclaimer, the term of this patent is extended or adjusted under 35 U.S.C. 154(b) by 365 days.

(21) Appl. No.: 12/926,790

(22) Filed: Dec. 9, 2010

(65) Prior Publication Data

US 2011/0294001 A1 Dec. 1, 2011

(30) Foreign Application Priority Data

May 25, 2010 (KR) ........................ 10-2010-0048827

(51) Int. Cl.
| | |
|---|---|
| H01M 2/06 | (2006.01) |
| H01M 2/08 | (2006.01) |
| H01M 2/30 | (2006.01) |
| H01M 2/26 | (2006.01) |

(Continued)

(52) U.S. Cl.
CPC ........ *H01M 2/06* (2013.01); *H01M 2/08* (2013.01); *H01M 2/263* (2013.01); *H01M 2/30* (2013.01); *H01M 10/0431* (2013.01); *H01M 2/0217* (2013.01); *H01M 10/0587* (2013.01)

(58) Field of Classification Search
CPC ........... H01M 2/30; H01M 2/06; H01M 2/08; H01M 2/263; H01M 10/0431

USPC ........................................ 429/181, 178–180
See application file for complete search history.

(56) References Cited

U.S. PATENT DOCUMENTS 3,080,440 A * 3/1963 Ruetschi et al. ................ 429/59
3,839,093 A * 10/1974 Twogood et al. ............. 429/185

(Continued)

FOREIGN PATENT DOCUMENTS

| JP | 2006-019292 A | 1/2006 |
|---|---|---|
| JP | 2006-093122 A | 4/2006 |
| KR | 10 2006-0060463 A | 6/2006 |

OTHER PUBLICATIONS

Korean Notice of Allowance in KR 10-2010-0048827, dated Sep. 6, 2012 (Byun, et al.).

*Primary Examiner* — Sean P Cullen
(74) *Attorney, Agent, or Firm* — Lee & Morse, P.C.

(57) ABSTRACT

A secondary battery and an electric vehicle or hybrid electric vehicle, the secondary battery including a case; an electrode terminal coupled to an electrode assembly in the case; a nut fastened with the electrode terminal, the nut having a thread on an inner circumferential surface thereof; a cap plate hermetically sealing the case, the electrode terminal extending through the cap plate; and a seal gasket between the electrode terminal and the cap plate, the seal gasket being compressed by the nut, wherein the electrode terminal includes a flange part below a bottom surface of the cap plate, an insertion part passing through a through-hole of the cap plate, and a fastening part having a thread recess engaged with the thread of the nut, and wherein the nut is rotatably fastened with the fastening part of the electrode terminal, such that a front end of the thread contacts a back end of the thread recess when viewed from a rotation direction of the nut.

11 Claims, 8 Drawing Sheets

(51) Int. Cl.
 *H01M 10/04* (2006.01)
 *H01M 2/02* (2006.01)
 *H01M 10/0587* (2010.01)

(56) References Cited

U.S. PATENT DOCUMENTS 4,719,157 A * 1/1988 Tsutsumi et al. ............ 429/469
5,834,134 A * 11/1998 Hooke et al. ................ 429/181
6,013,388 A * 1/2000 Stadnick et al. ............. 429/120
2005/0079413 A1* 4/2005 Schubert ..................... 429/185
2005/0287434 A1 12/2005 Kim et al.
2006/0063068 A1 3/2006 Cheon et al.
2009/0064487 A1* 3/2009 Hashimoto et al. .......... 29/623.2
2009/0186269 A1* 7/2009 Kim et al. .................... 429/179
2011/0136000 A1* 6/2011 Moon et al. .................. 429/163

* cited by examiner

SECONDARY BATTERY HAVING ELECTRODE TERMINAL FASTENED WITH NUT

BACKGROUND

1. Field

Embodiments relate to a secondary battery.

2. Description of the Related Art

Generally, unlike a primary battery which is not rechargeable, a secondary battery is capable of being charged and discharged. A low-capacity secondary battery composed of a single battery cell may be used as a power source for various small portable electronic devices, e.g., cellular phones and camcorders. A high-capacity secondary battery in which a plurality of battery cells are connected to each other in a pack structure may be used as a power source for, e.g., driving a motor of a hybrid electric vehicle.

Secondary batteries may be manufactured in various shapes. Generally, secondary batteries may be classified as, e.g., a cylindrical shape battery or a prismatic shape battery. The secondary battery is formed such that an electrode assembly formed by disposing a separator as an insulator between positive and negative electrode plates and an electrolyte are accommodated in a case. A cap assembly having electrode terminals may then be provided on the case. The electrode terminals may be connected to the electrode assembly and may be externally exposed through the cap plate.

Here, gaps may exist between the electrode terminals and the cap plate, and an electrolyte may infiltrate or leak out through the gaps. When the electrolyte infiltrates through gaps between the electrode terminal and the cap plate, an electrical short circuit may occur between the electrode terminal and the cap plate, rapidly deteriorating the battery and reducing battery capacity. Also, when such leakage occurs through a gap between a cap plate and electrode to the outside, the leaked electrolyte may corrode various structures outside of or adjacent to the battery. In addition, moisture from the outside may enter a case through the gaps. Such an unfavorable phenomenon may be aggravated in a case of a secondary battery employed in an electric device that repeatedly vibrates, such as an electric vehicle or an electric drill.

SUMMARY

Embodiments are directed to a secondary battery, which represents advances over the related art.

It is a feature of an embodiment to provide a secondary battery that improves sealing efficiency of electrode terminals by suppressing a nut from being unscrewed even in the event of external vibrations or external impacts.

At least one of the above and other features and advantages may be realized by providing a secondary battery including a case; an electrode terminal coupled to an electrode assembly in the case; a nut fastened with the electrode terminal, the nut having a thread on an inner circumferential surface thereof; a cap plate hermetically sealing the case, the electrode terminal extending through the cap plate; and a seal gasket between the electrode terminal and the cap plate, the seal gasket being compressed by the nut, wherein the electrode terminal includes a flange part below a bottom surface of the cap plate, an insertion part passing through a through-hole of the cap plate, and a fastening part having a thread recess engaged with the thread of the nut, and wherein the nut is rotatably fastened with the fastening part of the electrode terminal, such that a front end of the thread contacts a back end of the thread recess when viewed from a rotation direction of the nut.

The secondary battery may further include an upper insulator between the cap plate and the nut; and a washer between the upper insulator and the nut.

A plane of the washer may be located higher than the back end of the thread in a condition where the nut is not yet fastened with the electrode terminal, and a bottom surface of the nut may be located at a same height as the back end of the thread recess in a condition where the nut has been fastened with the electrode terminal.

A height difference between the plane of the washer and the back end of the thread recess prior to fastening may be smaller than a thickness of the seal gasket.

A height difference between the plane of the washer and the back end of the thread recess may be within a range in which the seal gasket can be maintained at a compressed state within its elastic limit when the nut is fastened with the electrode terminal.

When a thickness of the seal gasket, before it is compressed, is about 0.7 to about 0.8 mm, the height difference between the plane of the washer and the back end of the thread recess may be about 0.1 to about 0.2 mm.

The secondary battery may further include a lower insulator between the flange part and the cap plate.

The seal gasket may include at least one of polyphenylene sulfide (PPS), polyperfluoroalkoxyethylene (PFA), and polypropylene (PP).

The lower insulator may include the same material as the seal gasket.

A diameter of the insertion part may be about equal to a diameter of the fastening part.

A diameter of the insertion part may be greater than a diameter of the fastening part.

The electrode terminal may include a tapering part TP between the insertion part and the fastening part, the TP being tapered so as to avoid contact with the bottom surface of the nut.

At least one of the above and other features and advantages may also be realized by providing an electric vehicle or hybrid electric vehicle including the secondary battery of an embodiment

BRIEF DESCRIPTION OF THE DRAWINGS

The above and other features and advantages will become more apparent to those of ordinary skill in the art by describing in detail exemplary embodiments with reference to the attached drawings, in which.

DETAILED DESCRIPTION

Figure 1:
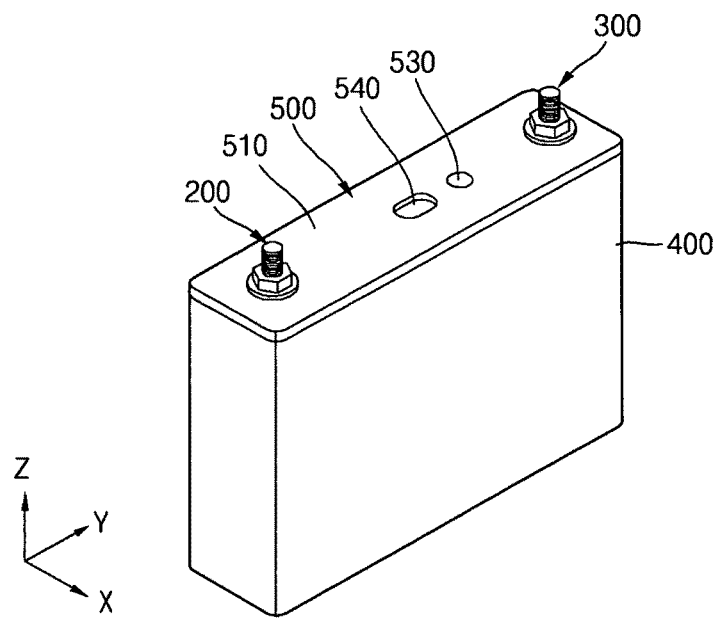
FIG. 1 illustrates a perspective view of a secondary battery according to an embodiment.

Korean Patent Application No. 10-2010-0048827, filed on May 25, 2010, in the Korean Intellectual Property Office, and entitled: "Secondary Battery," is incorporated by reference herein in its entirety.

Example embodiments will now be described more fully hereinafter with reference to the accompanying drawings; however, they may be embodied in different forms and should not be construed as limited to the embodiments set forth herein. Rather, these embodiments are provided so that this disclosure will be thorough and complete, and will fully convey the scope of the invention to those skilled in the art.

In the drawing figures, the dimensions of layers and regions may be exaggerated for clarity of illustration. It will also be understood that when a layer or element is referred to as being "on" another element, it can be directly on the other element, or intervening elements may also be present. In addition, it will also be understood that when an element is referred to as being "between" two elements, it can be the only element between the two elements, or one or more intervening elements may also be present. Like reference numerals refer to like elements throughout.

Figure 2:
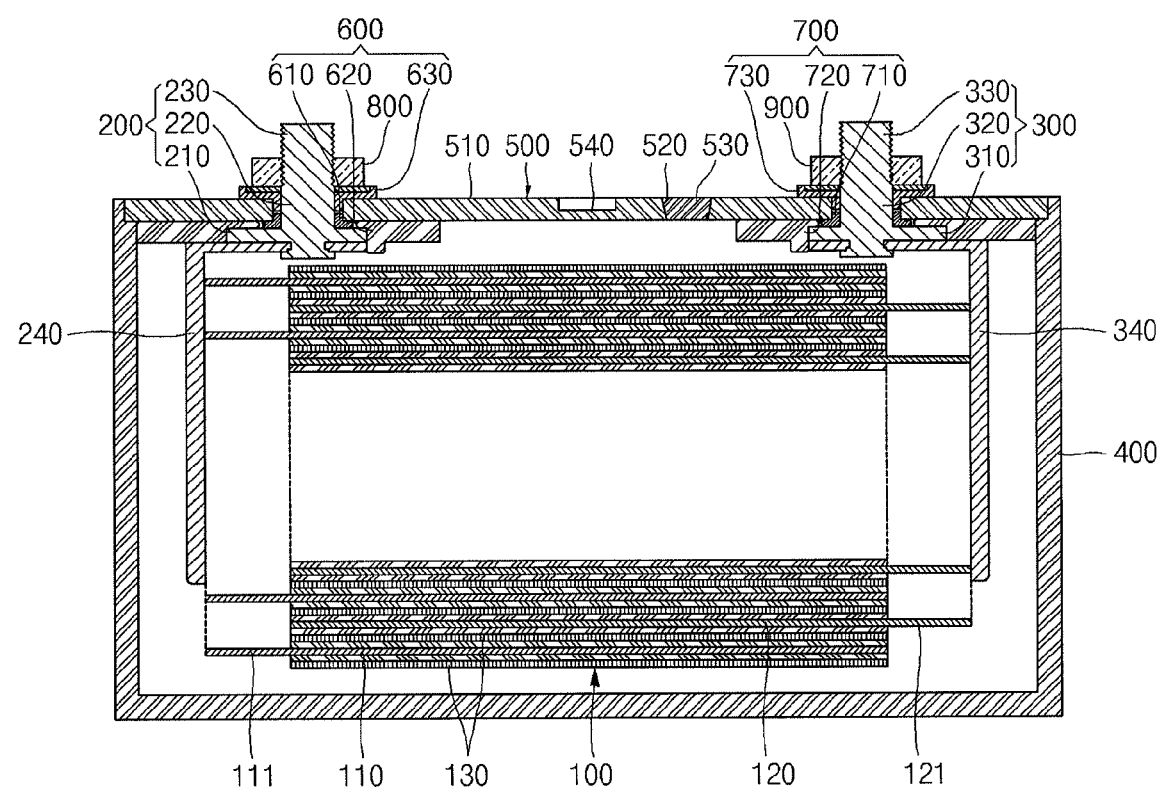
FIG. 2 illustrates a sectional view of the secondary battery of FIG. 1.

FIG. 1 illustrates a perspective view of a secondary battery according to an embodiment. FIG. 2 illustrates a sectional view of the secondary battery of FIG. 1.

As shown in FIGS. 1 and 2, the secondary battery according to the present embodiment may include an electrode assembly 100, a first electrode terminal 200, a second electrode terminal 300, a case 400, a cap assembly 500 including a cap plate 510, a first nut 800, and a second nut 900.

The electrode assembly 100 may be formed by winding or folding a stacked structure including a first electrode plate 110 shaped of a thin plate or foil, a second electrode plate 120, and a separator 130 interposed between the first electrode plate 110 and the second electrode plate 120. In an implementation, the first electrode plate 110 may be a positive electrode and the second electrode plate 120 may be a negative electrode.

The first electrode plate 110 may be formed by coating a first electrode active material, e.g., a transition metal oxide, on a first electrode collector made of a metal foil including, e.g., aluminum (Al). The first electrode plate 110 may include a first electrode uncoated portion 111 that is not coated with the first electrode active material. The first electrode uncoated portion 111 may provide a current flow path between the first electrode plate 110 and an outside of the first electrode plate 110. However, the embodiments do not limit the material of the first electrode plate 110 to that listed herein.

The second electrode plate 120 may be formed by coating a second electrode active material, e.g., graphite or a carbon material, on a second electrode collector made of a metal foil including, e.g., nickel (Ni) or copper (Cu). The second electrode plate 120 may include a second electrode uncoated portion 121 that is not coated with the second electrode active material. The second electrode uncoated portion 121 may provide a current flow path between the second electrode plate 120 and an outside of the second electrode plate 120. However, the embodiments do not limit the material of the second electrode plate 120 to those listed herein.

In addition, the first electrode plate 110 and the second electrode plate 120 may be arranged by reversing their polarities.

The separator 130, positioned between the first electrode plate 110 and the second electrode plate 120, may prevent an electrical short therebetween and may allow for movement of lithium ions. The separator 130 may be formed of, e.g., polyethylene (PE), polypropylene (PP), or a composite film of PE and PP. However, the embodiments do not limit the material of the separator 130 to those listed herein.

The first electrode terminal 200 and the second electrode terminal 300 may be coupled to ends of the electrode assembly 100 to be electrically connected to the first electrode plate 110 and the second electrode plate 120, respectively.

The electrode assembly 100 may be received in the case 400 together with an electrolyte (not shown). The electrolyte may include an organic solvent, e.g., ethylene carbonate (EC), propylene carbonate (PC), ethyl methyl carbonate (EMC), dimethyl carbonate (DMC), or the like, and a lithium salt, e.g., lithium hexafluorophosphate ($LiPF_6$), lithium tetrafluoroborate ($LiBF_4$), or the like. The electrolyte may be in a liquid, solid, or gel phase.

If the electrolyte infiltrates into an area between the first electrode terminal 200 and the cap assembly 500 or an area between the second electrode terminal 300 and the cap assembly 500, a breakdown voltage may be lowered, causing an electrical short between the first electrode terminal 200 and the cap assembly 500 and/or between the second electrode terminal 300 and the cap assembly 500.

The case 400 may be formed of a conductive metal, e.g., aluminum, aluminum alloy, or nickel-plated steel, and may have an approximately rectangular parallelepiped shape having an opening through which the electrode assembly 100 and the electrolyte are received to be settled on the case 400. Although the opening is not illustrated in FIG. 2 because the case 400 and the cap assembly 500 are coupled to each other, the opening corresponds to a portion formed when an upper peripheral portion of the cap assembly 500 is opened. An internal surface of the case 400 may be processed by insulation, i.e., may be insulated, so that it is insulated from the electrode assembly 100, the first electrode terminal 200, and the second electrode terminal 300.

The cap assembly 500 may be coupled to the case 400. As described above, the cap assembly 500 may include the cap plate 510. The cap plate 510 may hermetically seal the opening of the case 400 and may be made of the same material as the case 400. In addition, the cap plate 510 may include a plug 530 that plugs up an electrolyte injection hole 520 and a safety vent 540 that has a relatively small thickness.

The cap assembly 500 may include a first sealing portion 600 and a second sealing portion 700.

The first sealing portion 600 may include a first seal gasket 610, a first lower insulator 620, and a first upper insulator 630, through which a first insertion part 220 of the first electrode terminal 200 extends. Since the first seal gasket 610 may be interposed between the first electrode terminal 200 and the cap plate 510, electrolyte injection or leaking may be prevented and a breakdown voltage may increase, thereby preventing an electrical short between the first electrode terminal 200 and the cap plate 510.

The first lower insulator 620 may be disposed at an exterior of the first seal gasket 610 and may closely contact a bottom surface of the cap plate 510. The first upper insulator 630 may be coupled to the first insertion part 220 of the first electrode terminal 200 and may closely contact a top surface of the cap plate 510.

The second sealing portion 700 may include a second seal gasket 710, a second lower insulator 720, and a second upper insulator 730, through which a second insertion part 320 of the second electrode terminal 300 extends. Since the second seal gasket 710 may be interposed between the second electrode terminal 300 and the cap plate 510, electrolyte injection or leaking may be prevented and a breakdown voltage may increase, thereby preventing an electrical short between the second electrode terminal 300 and the cap plate 510.

The second lower insulator 720 may be disposed at an exterior of the second seal gasket 710 and may closely contact a bottom surface of the cap plate 510. The second upper insulator 730 may be coupled to the second insertion part 320 of the second electrode terminal 300 and may closely contact the top surface of the cap plate 510.

The first electrode terminal 200 may be made of a conductive material, e.g., aluminum, and may be welded to the first electrode uncoated portion 111 of the first electrode plate 110 at one end of the electrode assembly 100. The first electrode terminal 200 may include a first flange part 210, the first insertion part 220, and a first fastening part 230.

The first flange part 210 may be integrally formed at a lower portion of the first insertion part 220 and may be disposed below the bottom surface of the cap plate 510. The first seal gasket 610 may be provided between the first flange part 210 and the cap plate 510. In addition, the first flange part 210 and the first electrode uncoated portion 111 may be connected to each other through a first collector tab 240.

The first insertion part 220 may be inserted into a through-hole of the cap plate 510. The outer circumferential surface of the first insertion part 220 may not include a thread or a thread recess.

The first fastening part 230 may be integrally formed at an upper portion of the first insertion part 220 and may be disposed over or higher than the top surface of the cap plate 510. A thread recess may be formed thereon so as to be engaged with a thread of the first nut 800.

The second electrode terminal 300 may be made of a conductive material, e.g., nickel, and may contact the second electrode uncoated portion 121 of the second electrode plate 120 at another end of the electrode assembly 100. The second electrode terminal 300 may include a second flange part 310, a second insertion part 320, and a second fastening part 330.

The second flange part 310 may be integrally formed with a lower portion of the second insertion part 320 and may be disposed below the bottom surface of the cap plate 510. A second seal gasket 710 may be provided between the second flange part 310 and the cap plate 510. In addition, the second flange part 310 and the second electrode uncoated portion 121 may be connected to each other through a second collector tab 340.

The second insertion part 320 may be inserted into a through-hole of the cap plate 510. An outer circumferential surface of the second insertion part 320 may not include a thread or a thread recess.

The second fastening part 330 may be integrally formed with an upper portion of the second insertion part 320 and may be located above or higher than the top surface of the cap plate 510. A thread recess may be formed thereon so as to be engaged with a thread of the second nut 900.

The first nut 800 may include the thread so as to be engaged with the thread recess of the first fastening part 230 of the first electrode terminal 200. The first nut 800 may be fastened with the first fastening part 230 of the first electrode terminal 200.

The second nut 900 may include the thread so as to be engaged with the thread recess of the second fastening part 330 of the second electrode terminal 300. The second nut 900 may be fastened with the second fastening part 330 of the second electrode terminal 300.

Since the first electrode terminal 200 and the second electrode terminal 300 have the same configuration with each other, and the first sealing portion 600 and the second sealing portion 700 have the same configuration with each other, the secondary battery according to the present embodiment will be described with respect to the first electrode terminal 200 and the first sealing portion 600. In the following description, the first electrode terminal 200 is briefly referred to as the electrode terminal 200, the first flange part 210 as the flange part 210, the first insertion part 220 as the insertion part 220, the first fastening part 230 as the fastening part 230, the first seal gasket 610 as the seal gasket 610, the first lower insulator 620 as the lower insulator 620, and the first upper insulator 630 as the upper insulator 630, respectively.

Hereinafter, the secondary battery according to an embodiment will be described in detail with reference to FIGS. 3 through 6.

Figure 3:
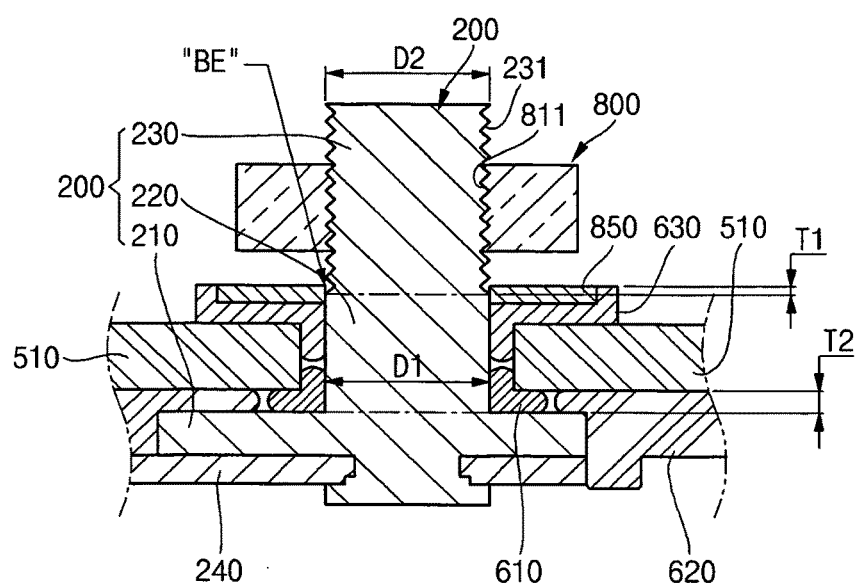
FIG. 3 illustrates an enlarged sectional view of a state in which a nut is not yet tightly fastened in the secondary battery of FIG. 1.
Figure 4:
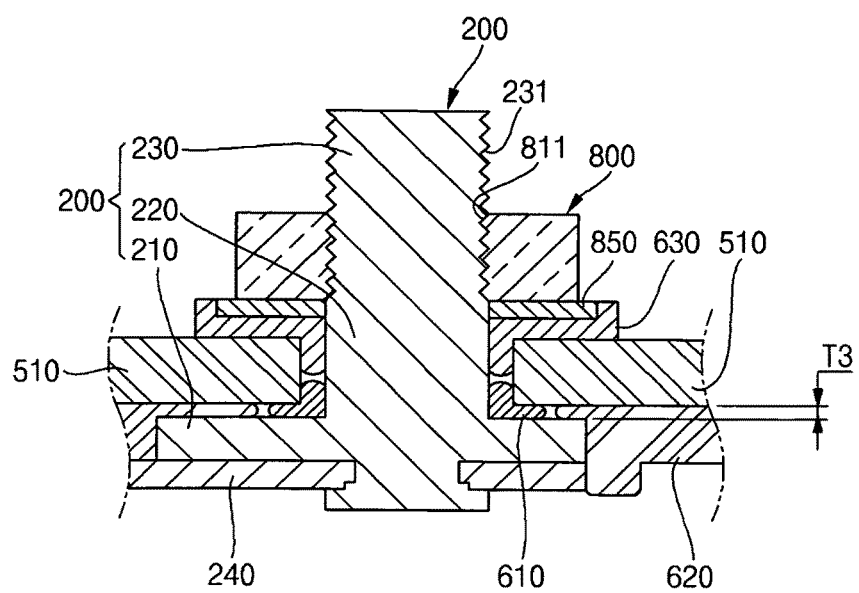
FIG. 4 illustrates an enlarged sectional view of a state in which a nut has been tightly fastened in the secondary battery shown in FIG. 1.
Figure 5:
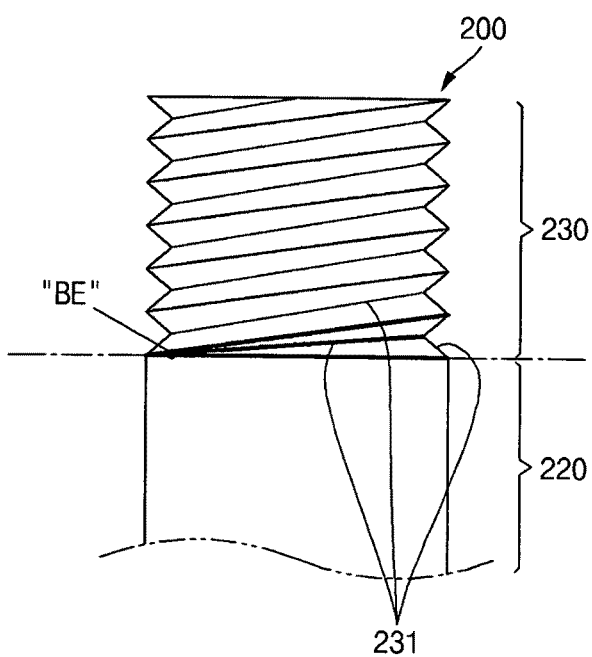
FIG. 5 illustrates an enlarged front view of an electrode terminal in the secondary battery of FIG. 1.
Figure 6:
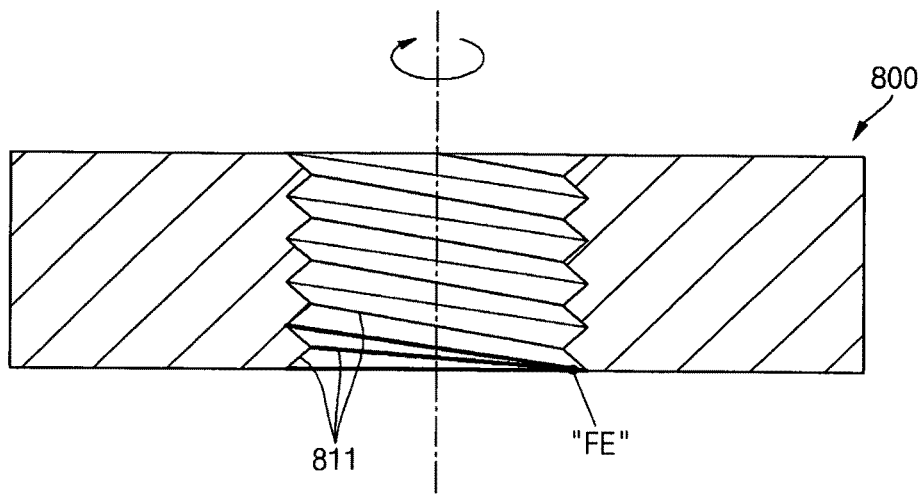
FIG. 6 illustrates a sectional view of a nut in the secondary battery of FIG. 1.

FIG. 3 illustrates an enlarged sectional view of a state in which a nut is not yet tightly fastened in the secondary battery of FIG. 1. FIG. 4 illustrates an enlarged sectional view of a state in which a nut has been tightly fastened in the secondary battery of FIG. 1. FIG. 5 illustrates a front view of an electrode terminal in the secondary battery of FIG. 1. FIG. 6 illustrates a longitudinal sectional view of a nut in the secondary battery of FIG. 1.

As shown in FIGS. 3 and 4, a diameter D1 of the insertion part 220 of the electrode terminal 200 may be about equal to a diameter D2 of the fastening part 230 in the electrode terminal 200. In order to compress the seal gasket 610, the nut 800 may be rotatably fastened with the fastening part 230 of the electrode terminal 200. Specifically, as shown in FIGS. 5 and 6, when viewed from a rotation direction of the nut 800 (a clockwise direction as indicated by the arrow of FIG. 6), the nut 800 rotates and may be fastened with the fastening part 230 until a front end FE of a thread 811 of the nut 800 completely comes into contact with a back end BE of a thread recess 231 of the fastening part 230 in the electrode terminal 200. Here, deformation may occur at certain portions of the front end FE of the thread 811 and the back end BE of the thread recess 231 within their own elastic limits due to a frictional force applied when the front end FE of the thread 811 completely comes into contact with the back end BE of the thread recess 231 of the fastening part 230. The deformation may allow the front end FE of the thread 811 and the back end BE of the thread recess 231 to maintain a surface contact state at their surrounding areas. Consequently, the frictional force applied when the front end FE of the thread 811 completely comes into contact with the back end BE of the thread recess 231 may be much larger than a frictional force applied when the front end FE of the thread 811 does not make contact with the back end BE of the thread recess 231. That is to say, the nut 800 may not readily be unscrewed.

Therefore, since both an elastically repulsive force of the seal gasket 610 and the frictional force may be applied to the nut 800, a torque of the nut 800 may be maintained in a more stable manner. That is to say, it is possible to minimize undesirable unscrewing of the nut 800. In particular, even when the secondary battery according to the present embodiment is employed in an electric device that repeatedly vibrates, such as a vehicle (e.g., an electric vehicle, a hybrid electric vehicle, or an internal combustion engine vehicle incorporating batteries), or an electric drill, the nut 800 may not be or may only be minimally unscrewed, thereby continuously maintaining battery sealing efficiency.

In addition, a washer 850 may further be provided between the upper insulator 630 and the nut 800. When a plane washer is used as the washer 850, a frictional force may be further applied to the nut 800. Alternatively, a spring washer may be used as the washer 850. In this case, an elastically repulsive force may further be applied to the nut 800. Consequently, the torque of the nut 800 may be maintained in a more stable manner.

As shown in FIG. 3, before the nut 800 is tightly fastened with the electrode terminal 200, the plane of the washer 850 may be located higher than the back end BE of the thread recess 231. That is to say, as shown in FIG. 3, a height difference T1 may exist between the plane of the washer 850 and the back end BE of the thread recess 231. Here, the plane of the washer 850 may be higher than the back end BE of the thread recess 231. Then, as shown in FIG. 4, after the nut 800 is tightly fastened with the fastening part 230 of the electrode terminal 200, a bottom surface of the nut 800 may be located at a same height with the back end BE of the thread recess 231. That is to say, as the nut 800 is fastened with the fastening part 230 of the electrode terminal 200, the plane of the washer 850 may be pressed; and a pressing force applied to the plane of the washer 850 may be, in turn, transferred to the washer 850, the cap plate 510, and the seal gasket 610, thereby compressing the seal gasket 610 (see "T2" of FIG. 3 and "T3" of FIG. 4).

More specifically, the height difference T1 between the plane of the washer 850 and the back end BE of the thread recess 231 may be smaller than an uncompressed thickness T2 of the seal gasket 610. That is to say, a reason for making the height difference T1 between the plane of the washer 850 and the back end BE of the thread recess 231 smaller than the uncompressed thickness T2 of the seal gasket 610 may be to maintain a thickness ("T3" of FIG. 4) of the seal gasket 610 after being compressed, even when the nut 800 is fastened with the fastening part 230 of the electrode terminal 200.

Particularly, the height difference T1 between the plane of the washer 850 and the back end BE of the thread recess 231 may be set within a range in which the seal gasket 610 may be maintained at a compressed state ("T3" of FIG. 4) within the elastic limit when the nut 800 is fastened with the electrode terminal 200. That is to say, with the height difference T1, even if the seal gasket 610 is compressed, the elastically repulsive force of the seal gasket 610 may be maintained without deformation.

For example, when the uncompressed thickness T2 of the seal gasket 610 before it is compressed is about 0.7 to about 0.8 mm, the height difference T1 between the plane of the washer 850 and the back end BE of the thread recess 231 in the nut 800 may be about 0.1 to about 0.2 mm. In particular, according to an example, it was observed that the elastically repulsive force was not properly applied to the seal gasket 610 when the height difference T1 was smaller than 0.1 mm. In addition, it was observed that the seal gasket 610 exceeded its elastic limit when the height difference T1 was greater than 0.2 mm. Thicknesses of the washer 850, the upper insulator 630, and the cap plate 510 were not taken into consideration because extents of their compression were negligible compared to the compression of the seal gasket 610. Here, the thickness of the washer 850 used in the experiment was approximately 0.5 mm, the thickness of the upper insulator 630 used in the experiment was approximately 0.2 mm, and the thickness of the cap plate 510 used in the experiment was approximately 3 mm. In addition, the material of the seal gasket 610 used in the experiment was polyperfluoroalkoxyethylene (PFA).

In an implementation, the seal gasket 610 may include at least one of polyphenylene sulfide (PPS), polyperfluoroalkoxyethylene (PFA), and polryproylene (PP). In this case, the lower insulator 620 may be made of the same material as the seal gasket 610. In an implementation, when a portion of the lower insulator 620 is positioned between the flange part 210 of the electrode terminal 200 and the cap plate 510, the portion of the lower insulator 620 and the seal gasket 610 may be parallel to each other. Thus, if the lower insulator 620 and the seal gasket 610 are formed using the same material, even when the nut 800 is fastened with the fastening part 230 of the electrode terminal 200, the seal gasket 610 may be compressed accurately as expected.

Hereinafter, a secondary battery according to another embodiment will be described in detail with reference to FIGS. 7 and 8.

Figure 7:
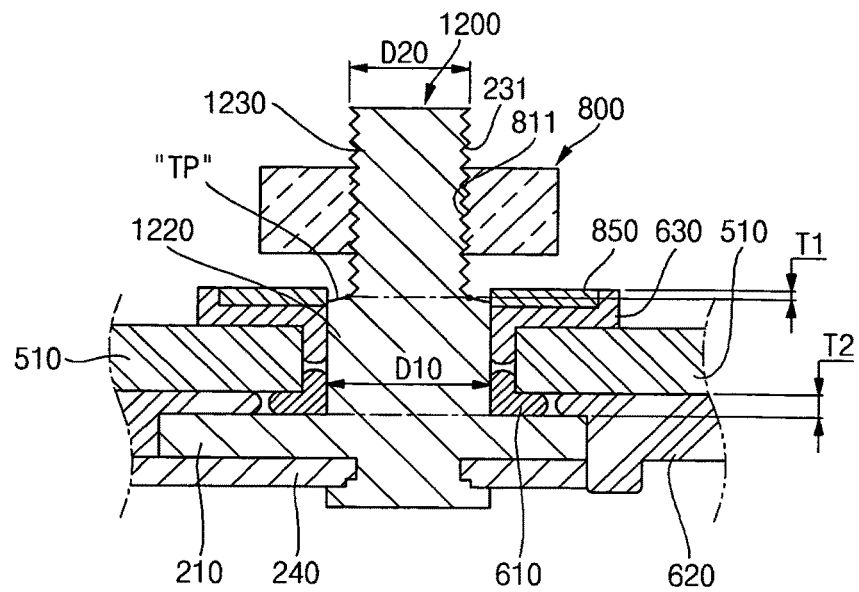
FIG. 7 illustrates an enlarged sectional view of a state in which a nut is not yet tightly fastened in a secondary battery according to another embodiment.

FIG. 7 illustrates an enlarged sectional view of a state in which a nut is not yet tightly fastened in a secondary battery according to another embodiment. FIG. 8 illustrates an enlarged sectional view of a state in which a nut has been tightly fastened in the secondary battery of FIG. 7.

Figure 8:
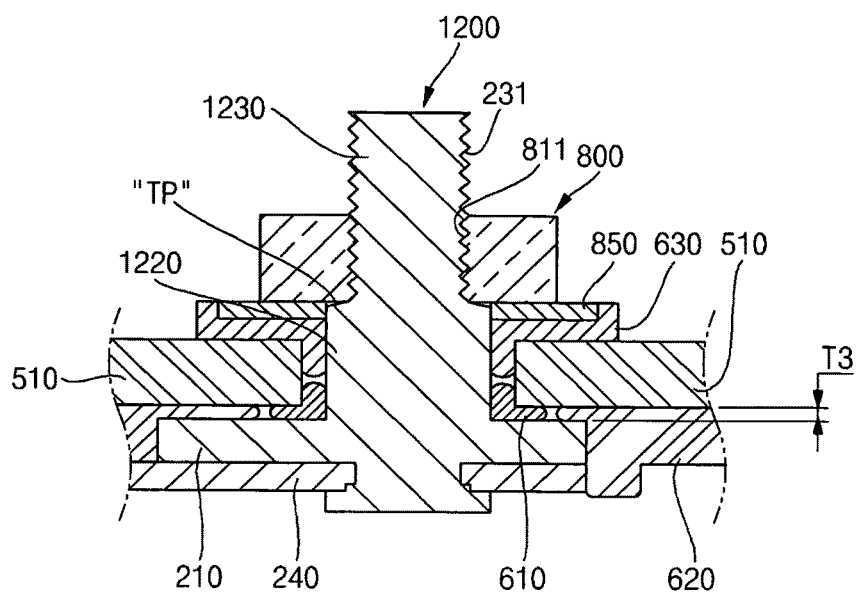
FIG. 8 illustrates an enlarged sectional view of a state in which a nut has been tightly fastened in the secondary battery of FIG. 7.

As shown in FIGS. 7 and 8, the secondary battery according to the present embodiment is substantially the same as the secondary battery according to the previous embodiment, except for diameters of an insertion part 1220 and a fastening part 1230 of the electrode terminal 1200. The secondary battery according to the present embodiment will now be described with respect to the diameters of the insertion part 1220 and the fastening part 1230.

As shown in FIGS. 7 and 8, when the diameter D10 of the insertion part 1220 is greater than the diameter D20 of the fastening part 1230, the nut 800, which may be tightly fitted into the insertion part 1220, is not lowered below the insertion part 1220 even by forcibly rotating the nut 800 using a mechanical force.

In addition, as shown in FIG. 7, a tapering part TP may be formed between the insertion part 1220 and the fastening part 1230. The tapering part TP may be tapered so as not to contact a bottom surface of the nut 800. That is to say, if the tapering part TP were to contact the bottom surface of the nut 800, it would be quite difficult to fully rotate the nut 800 due to a deviation that may be created on each of surfaces of the thread 811 and the thread recess 231 of the fastening part 1230. In other words, it may become difficult to make the front end (FE of FIG. 6) of the thread (811 of FIG. 6) of the nut 800 contact the back end (BE of FIG. 5) of the thread recess (231 of FIG. 5) of the electrode terminal 200. However, according to the present embodiment, the nut 800 may be fully rotated by forming the tapering part TP at its bottom portion so as to not contact the bottom surface of the nut 800.

As described above, the secondary battery according to the embodiments may have the following effects and merits.

According to the embodiments, in order to maintain a torque of the nut 800, both the repulsive force (i.e., an elastic force) of the seal gasket 610 and the frictional force between the nut 800 and the electrode terminal 200 may be applied to the nut 800, thereby inhibiting unscrewing of the nut 800. Consequently, even when external vibrations or external impacts occur, it is possible to inhibit the unscrewing of the nut 800, thereby ultimately improving sealing efficiency of the electrode terminal 200.

Exemplary embodiments have been disclosed herein, and although specific terms are employed, they are used and are to be interpreted in a generic and descriptive sense only and not for purpose of limitation. Accordingly, it will be understood by those of ordinary skill in the art that various changes in form and details may be made without departing from the spirit and scope of the present invention as set forth in the following claims.

What is claimed is:

1. A secondary battery, comprising:
    a case;
    an electrode terminal coupled to an electrode assembly in the case;
    a nut fastened with the electrode terminal, the nut having a thread on an inner circumferential surface thereof;
    a cap plate hermetically sealing the case, the electrode terminal extending through the cap plate;
    a seal gasket between the electrode terminal and the cap plate, the seal gasket contacting a bottom surface of the cap plate and being compressed by the nut;
    an upper insulator between the cap plate and the nut; and
    a washer between the upper insulator and the nut, the washer being directly disposed on the upper insulator, the washer being surrounded by the upper insulator, wherein the electrode terminal includes:
        a flange below the cap plate,
        an insertion part passing through a through-hole of the cap plate, and
        a fastening part having a thread recess engaged with the thread of the nut,
    wherein the nut is rotatably fastened with the fastening part of the electrode terminal, such that a front end of the thread contacts a back end of the thread recess when viewed from a rotation direction of the nut, wherein a plane of the washer is located higher than the back end of the thread in a condition where the nut is not yet fastened with the electrode terminal, and wherein a bottom surface of the nut is located at a same height as the back end of the thread recess in a condition where the nut has been fastened with the electrode terminal.

2. The secondary battery as claimed in claim 1, wherein a height difference between the plane of the washer and the back end of the thread recess prior to fastening is smaller than a thickness of the seal gasket.

3. The secondary battery as claimed in claim 1, wherein a height difference between the plane of the washer and the back end of the thread recess is within a range in which the seal gasket is maintained at a compressed state within an elastic limit when the nut is fastened with the electrode terminal.

4. The secondary battery as claimed in claim 1, wherein when a thickness of the seal gasket, before being compressed, is about 0.7 to about 0.8 mm, the height difference between the plane of the washer and the back end of the thread recess is about 0.1 to about 0.2 mm.

5. The secondary battery as claimed in claim 1, wherein a diameter of the insertion part is equal to a diameter of the fastening part.

6. The secondary battery as claimed in claim 1, wherein a diameter of the insertion part is greater than a diameter of the fastening part.

7. The secondary battery as claimed in claim 6, wherein the electrode terminal includes a tapering part between the insertion part and the fastening part, the tapering part being tapered so as to avoid contact with the bottom surface of the nut.

8. The secondary battery as claimed in claim 1, further comprising a lower insulator between the flange and the cap plate.

9. The secondary battery as claimed in claim 8, wherein the seal gasket includes at least one of polyphenylene sulfide (PPS), polyperfluoroalkoxyethylene (PFA), or polypropylene (PP).

10. The secondary battery as claimed in claim 9, wherein the lower insulator includes a same material as the seal gasket.

11. An electric vehicle or hybrid electric vehicle including the secondary battery as claimed in claim 1.

* * * * *